(12) United States Patent
Raskar et al.

(10) Patent No.: US 9,106,841 B2
(45) Date of Patent: Aug. 11, 2015

(54) METHODS AND APPARATUS FOR HIGH SPEED CAMERA

(71) Applicants: Ramesh Raskar, Cambridge, MA (US); Christopher Barsi, Exeter, NH (US)

(72) Inventors: Ramesh Raskar, Cambridge, MA (US); Christopher Barsi, Exeter, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/304,566

(22) Filed: Jun. 13, 2014

(65) Prior Publication Data

US 2014/0368728 A1    Dec. 18, 2014

Related U.S. Application Data

(60) Provisional application No. 61/836,479, filed on Jun. 18, 2013.

(51) Int. Cl.
| | |
|---|---|
| *H04N 5/222* | (2006.01) |
| *H04N 5/243* | (2006.01) |
| *H04N 5/235* | (2006.01) |
| *H04N 5/30* | (2006.01) |
| *H01J 31/50* | (2006.01) |
| *G01J 11/00* | (2006.01) |

(52) U.S. Cl.
CPC .............. *H04N 5/243* (2013.01); *H01J 31/50* (2013.01); *H04N 5/2354* (2013.01); *H04N 5/30* (2013.01); *G01J 11/00* (2013.01)

(58) Field of Classification Search
CPC ..... H04N 5/23545; H04N 5/243; H04N 5/30; H04N 13/0282; H01J 31/50; G01J 17/08; G01S 11/00
USPC ...................... 348/218.1, 335, 340, 370, 371; 250/208.1; 356/5.01–5.08
See application file for complete search history.

(56) References Cited

U.S. PATENT DOCUMENTS

| 3,161,885 | A | 12/1964 | Corcoran |
| 3,245,748 | A | 4/1966 | Wadsworth et al. |
| 3,485,159 | A | 12/1969 | McCall |
| 5,668,593 | A | 9/1997 | Lareau et al. |
| 2011/0018967 | A1* | 1/2011 | Mirbach et al. ................. 348/46 |
| 2011/0299059 | A1 | 12/2011 | Buettgen et al. |
| 2012/0120285 | A1* | 5/2012 | Ko ................................ 348/241 |

OTHER PUBLICATIONS

Hansard, M., Lee, S., Choi, O., Horaud, R., 2012, Time-of-Flight Cameras, Principles, Methods and Applications, SpringerBriefs in Computer Science, Dec. 2012.

* cited by examiner

*Primary Examiner* — Lin Ye
*Assistant Examiner* — Chriss Yoder, III
(74) *Attorney, Agent, or Firm* — Stephen R. Otis

(57) ABSTRACT

In exemplary implementations of this invention, a light source illuminates a scene and a light sensor captures data about light that scatters from the scene. The light source emits multiple modulation frequencies, either in a temporal sequence or as a superposition of modulation frequencies. Reference signals that differ in phase are applied to respective subregions of each respective pixel. The number of subregions per pixel, and the number of reference signals per pixel, is preferably greater than four. One or more processors calculate a full cross-correlation function for each respective pixel, by fitting light intensity measurements to a curve, the light intensity measurements being taken, respectively, by respective subregions of the respective pixel. The light sensor comprises M subregions. A lenslet is placed over each subregion, so that each subregion images the entire scene. At least one temporal sequence of frames is taken, one frame per subregion.

20 Claims, 4 Drawing Sheets

METHODS AND APPARATUS FOR HIGH SPEED CAMERA

RELATED APPLICATIONS

This application is a non-provisional of, and claims the benefit of the filing date of, U.S. Provisional Application No. 61/836,479, filed Jun. 18, 2013, the entire disclosure of which is herein incorporated by reference.

FIELD OF THE TECHNOLOGY

The present invention relates generally to imaging equipment, including cameras.

SUMMARY

In exemplary implementations of this invention, an ultrafast camera captures multiple-millions of frames per second.

The camera includes a light source. The light source emits light to illuminate the scene being imaged, and modulates the radiant power of that light. For example, the modulation of the radiant power may approximate a square wave in time, so that the light repeatedly blinks on and off. Or, for example, the modulation of the radiant power may comprise a sinusoidal waveform, or may comprise any arbitrary periodic signal. For example, the modulation frequency (frequency of the periodic signal formed by modulating the radiant power of the light source) may be in the range of 30 MHz to 50 MHz.

To be clear, the modulation frequency is not the same as the frequency band (aka color) of the light which is being modulated. For example, if the light source emits broadband visible light in a frequency band from 400-790 terahertz (the visible light band), and the radiant power of the light source is modulated at 40 MHz, then the modulation frequency is 40 MHz.

The camera includes a light sensor. The light sensor has N pixels and comprises M subregions (blocks). Each block may comprise a separate pixel array, or each block may comprise a subdivision of a single large pixel array. The blocks in a rectangular light sensor may be arranged, for example, such that each block is a horizontal stripe of the light sensor. A lens is positioned in front of each block, so that each block images the entire scene. Each block has N/M pixels.

The M blocks in the light sensor capture M images of the scene during an M-block-sequence. As used herein, an "M-block-sequence" means a temporal sequence in which: (a) a first block, in a set of M blocks in a light sensor, captures a first image of a scene; (b) then a second block in the set captures a second image of the scene; (c) and so on, until the $M^{th}$ block in the set captures an $M^{th}$ image of the scene; such that each respective block, out of the M blocks in the light sensor, captures data regarding the scene during the temporal sequence. Thus, during an M-block-sequence, M blocks in a light sensor capture M frames.

The light source emits light at different modulation frequencies while imaging the scene. The multiple modulation frequencies may be emitted, for example: (a) in a temporal sequence, one modulation frequency at a time; (b) simultaneously by superposition, or (c) in a temporal sequence, one pattern at a time, where each pattern itself consists of multiple superimposed modulation frequencies.

During each respective M-block-sequence, the light source emits light in a single modulation frequency pattern. A single modulation frequency pattern may comprise a single modulation frequency (e.g., 30 MHz) or may instead comprise a linear superposition of multiple modulation frequencies (e.g., a linear superposition of a 30 MHz signal and a 50 MHz signal). The light source may emit the different modulation frequency patterns during different M-block-sequences.

The time offset between temporally adjacent frames in an M-block-sequence equals $1/f_{max}$, where $f_{max}$ is equal to the highest modulation frequency in the range of modulation frequencies that are emitted by the light source during imaging of the scene. For example, if the highest modulation frequency in the range is 100 MHz, then $f_{max}$ is equal to 100 MHz. (If a modulation frequency pattern comprises a superposition of modulation frequencies, then each of the modulation frequencies that are being superimposed is considered a separate modulation frequency, for purposes of determining the highest modulation frequency in the range.)

Each respective pixel in the light sensor comprises q subregions. During each respective frame, a phase-shifted reference signal is applied to modulate the gain of the q subregions of each respective pixel. For example, a phase-shifted reference signal may be applied to modulate the gain of the respective sub-regions of a pixel as follows: (a) the reference signal, phase-shifted by zero degrees, is applied to a first subregion of the pixel; (b) the reference signal, phase-shifted by x degrees, is applied to a second subregion of the pixel, (c) the reference signal, phase-shifted by 2x degrees, is applied to a third subregion of the pixel, and so on, until (d) the reference signal, phase-shifted by (q−1)x degrees, is applied to the $q^{th}$ subregion of the pixel. The frequency, phase and shape of the reference signal (before it is phase-shifted) are the same as the frequency, phase and shape of the control signal that controls the modulation of the radiant power of the light source, except that the reference signal and control signal may differ in amplitude.

Preferably, the total number of phase-shifts that are sampled is greater than four, in order to oversample the data. This oversampling makes the imaging more robust to noise in low-light applications. For example, in some cases, the total number of different phase-shifts that are sampled is eight or more. However, in some cases, the total number of different phase-shifts that are sampled is three or four. Preferably, the phase shift increment is constant and is evenly divisible by 360.

For each respective frame, the total charge recorded by each respective sub-region corresponds to a different value of the cross-correlation of the received signal S and the reference signal R. For each respective frame for each respective pixel, one or more processors compute a full cross-correlation function curve C, e.g., by fitting curve C to the measured data points (i.e., to the charges recorded by the respective sub-regions of the respective pixel during that frame.) For this computation, the processors execute an algorithm that applies to any arbitrary periodic received signal, regardless of whether the received signal is sinusoidal.

For each respective pixel for each respective frame, the processors perform computations to recover the incoming light signal S from the full cross-correlation function. For example, S may be computed as $S=F^{-1}\{F(C)/F(R)\}$, where C is the full cross-correlation pattern, R is the reference signal, F is a Fourier transform, and $F^{-1}$ is an inverse Fourier transform.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

The above Figures show some illustrative implementations of this invention, or provide information that relates to those implementations. However, this invention may be implemented in many other ways.

DETAILED DESCRIPTION

In exemplary implementations of this invention, a light source in the camera emits a continuous wave that is modulated at tens of MHz. This modulated light illuminates a scene, and then reflects back to the imaging system, where it is captured by a light sensor. The light sensor has N-pixels, and is divided into M different blocks, each of which is timed at relative offsets corresponding to the illumination frequency. In this way, each block becomes a separate frame of a high speed video, where the video has a time resolution inversely proportional to the time offset between temporally adjacent blocks.

Figure 1:
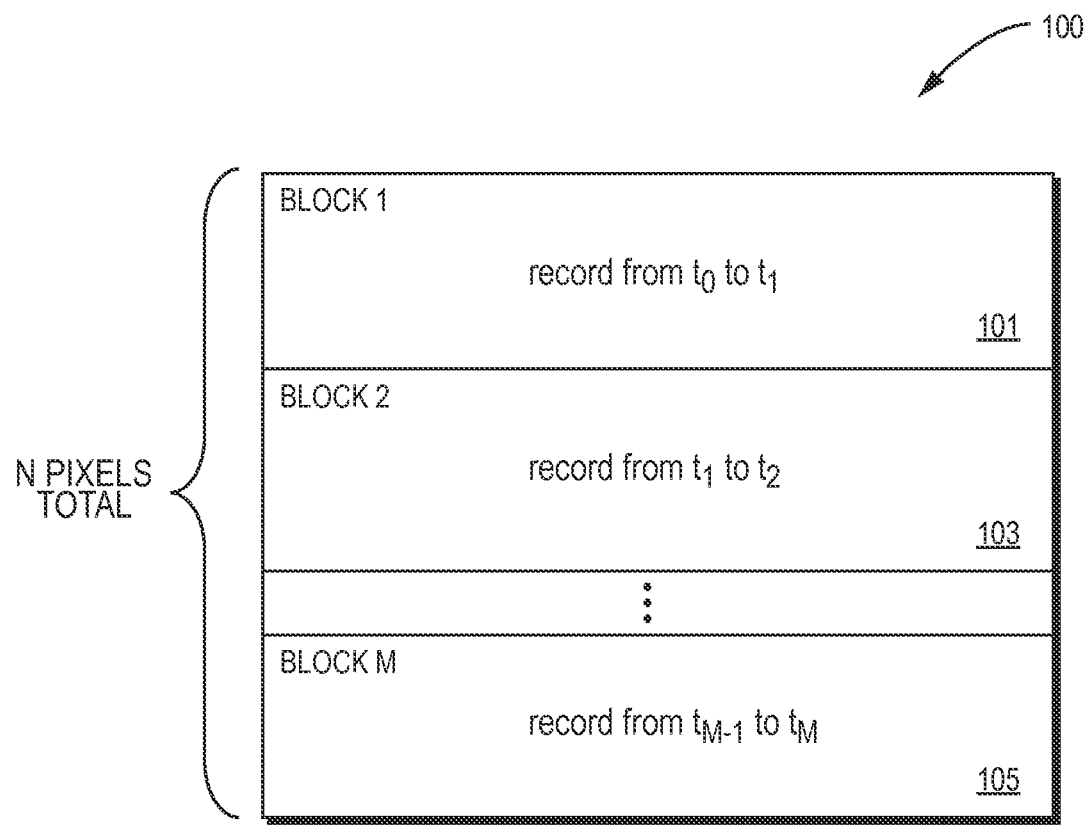
FIG. 1 shows M blocks in a light sensor capturing M frames during an M-block-sequence.

FIG. 1 shows M blocks in a light sensor 100 capturing M frames during an M-block-sequence. In the example shown in FIG. 1: the M-block-sequence is a temporal sequence in which (a) a first block 101 captures a first image of a scene during time period $t_0$ to $t_1$; (b) then a second block 103 captures a second image of the scene during time period $t_1$ to $t_2$; (c) and so on, until the $M^{th}$ block 105 captures an $M^{th}$ image of the scene during time period $t_{M-1}$ to $t_M$. In the preceding sentence, $t_0, t_1, t_2, \ldots, t_{M-1}, t_M$ are different times, where $t_0$ is the time at which the M-block-sequence starts, and $t_M$ is the time at which the M-block-sequence ends. Thus, each respective block, out of the M blocks in the light sensor 100, captures an image of the scene during the M-block-sequence. During an M-block-sequence, M blocks in a light sensor capture M frames.

The light sensor 100 has N pixels; and each of the M blocks has N/M pixels. The spatial resolution of the light sensor 100 is N/M. The time resolution of the light sensor 100 is $1/f_{max}$, where $f_{max}$ is equal to the highest modulation frequency in the range of modulation frequencies that are emitted by the light source during imaging of the scene.

In illustrative implementations of this invention: (a) the resolution per frame is MK/L; (b) the minimum phase shift is $\phi_{min}=2\pi f/f_0$; (c) the time resolution is $\Delta t=\phi_{min}/4\pi f=f_0/2$; (d) frames per second equals $1/\Delta t=2/f_0$; and (e) the total number of pixels in the light sensor is M×K; where (i) f is modulation frequency, (ii) $f_0$ is the clock speed for the signal generator (e.g., FPGA) that creates the electrical signal that controls the modulation of the emitted light; L is the number of frames captured; M is the number of blocks, and K is the number of pixels per block. For example, this invention may be implemented such that: f=50 MHz; $f_0$=1800 MHz; M=K=500, and L=20. (However, the preceding sentence is only one example, out of many examples, of how this invention can be implemented).

Figure 2:
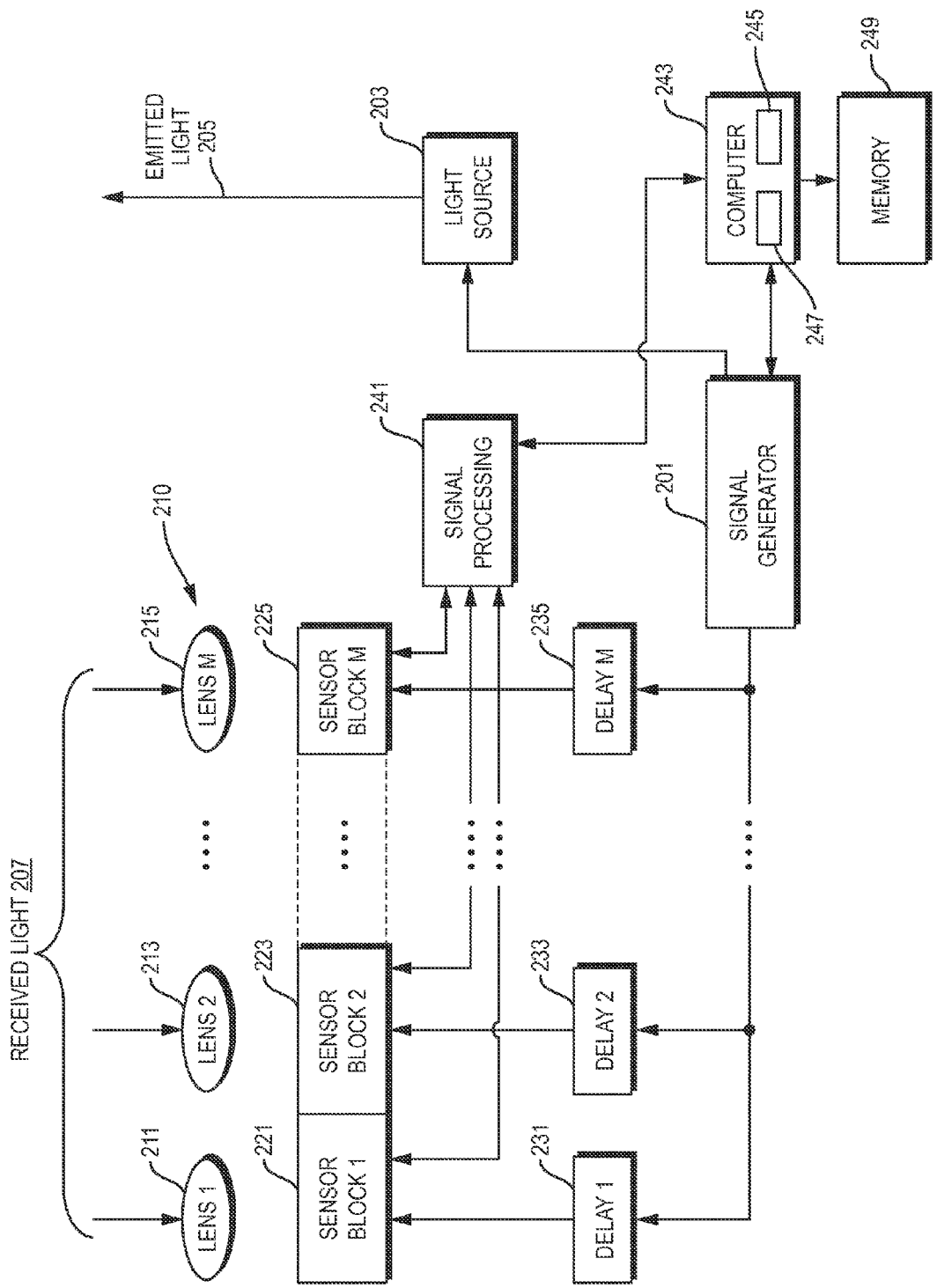
FIG. 2 shows hardware components of a camera.

FIG. 2 shows hardware components of a camera, in illustrative implementations of this invention. In the example shown in FIG. 2: A signal generator 201 generates an electrical reference signal and an electrical control signal. The frequency, phase and shape of the reference signal (before it has been phase-shifted) are the same as the frequency, phase and shape of the control signal, except that these signals may differ in amplitude.

The control signal controls the modulation of the radiant power of the light source 203. The light source 203 emits modulated light 205 that illuminates a scene. The light sensor comprises M sensor blocks (e.g., 221, 223, 225). The received light 207 that is reflected back from the scene passes through a lenslet array. The lenslet array comprises multiple lenslets (e.g., 211, 213, 215), positioned such that each respective lenslet is arranged in front of, and focuses received light onto, a respective sensor block. Thus, each sensor block captures an image of the entire scene.

Time-delay components (e.g., 231, 233, 235) delay the reference signal by different amounts, such that the reference signal sent to different sensor blocks is delayed by different amounts. The increment of delay, from one sensor block to an adjacent sensor block, is equal to time offset between temporally adjacent frames captured during M-block-sequence.

Also, each respective sensor block includes phase-shifting electronics that receive a reference signal and phase-shift it by different amounts such that, for each respective pixel in the sensor block, different phase shifts are applied to different subregions of the respective pixel. Alternatively, the phase-shifting electronics may be housed in the time-delay components (e.g., 231, 233, 235) or in the signal generator 201. A phase-shifted reference signal is applied to respective subregions of each respective pixel to modulate the gain of these subregions.

Signal processing electronics 241 perform analog-to-digital conversion and otherwise process signals received from the sensor blocks. The signal processing electronics 241 output electrical signals that are indicative of, among other things, sensor readings of the light sensor. The electrical signals are sent to a computer 243. One or more processors (e.g., 245, 247) may be housed in the computer 243. Data indicative of the sensor readings may be stored in a memory device 249.

The signal generator 201 may comprise, for example, a radio-frequency oscillator, a field programmable gate array (FPGA), or other integrated circuit. The light source 203 may comprise, for example, one or more forward-biased light-emitting diodes (LEDs) or one or more lasers. Alternatively, the light source 203 may comprise any other illumination source that can be modulated (in radiant power) at sufficiently high frequencies and that has a sufficiently wide modulation frequency bandwidth. The pixels in the light sensor may, for example, comprise CCD (charge-coupled device), CMOS (complementary metal-oxide-semiconductor), ICCD (intensified CCD), or EMCCD (electron-multiplying CCD) pixels.

Imaging optics 210 in front of the sensor blocks provide an image of the entire scene to each sensor block. For example, the imaging optics 210 may comprise a lenslet array that comprises multiple lenslets (e.g., 211, 213, 215). Alternatively, the imaging optics 210 may comprise a single lens and a scanning mirror system. For example, the scanning mirror system may comprise a galvanometer-actuated mirror that first reflects an image of the entire scene gathered by the single lens to a first block during a first frame of an M-block-sequence, and then reflects an image of the entire scene gathered by the single lens to a second block during a second frame of the sequence, and so on.

Figure 3A:
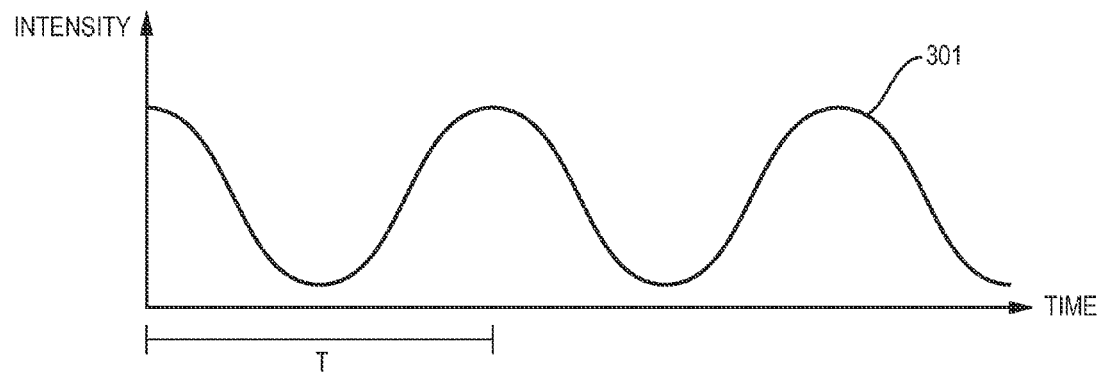
In FIG. 3A, the light modulation comprises a sinusoidal waveform.
Figure 3B:
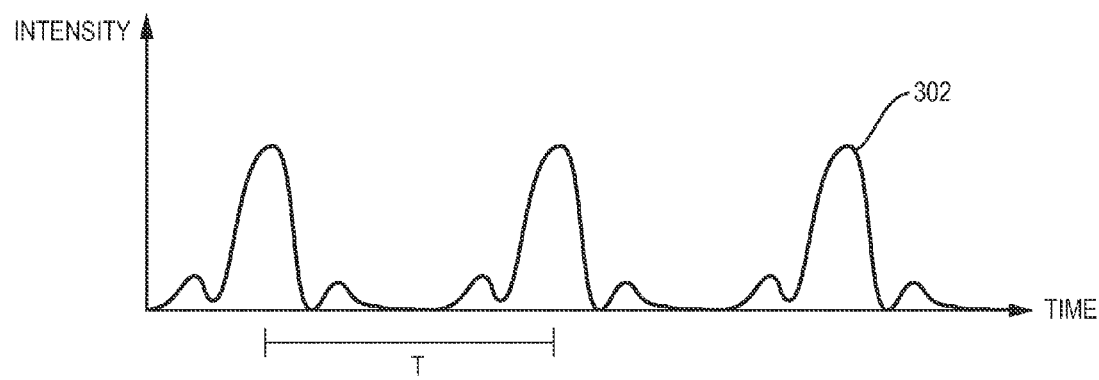
FIGS. 3B and 3C show two different examples, respectively, of light modulation which comprises a non-sinusoidal, periodic waveform.
Figure 3C:
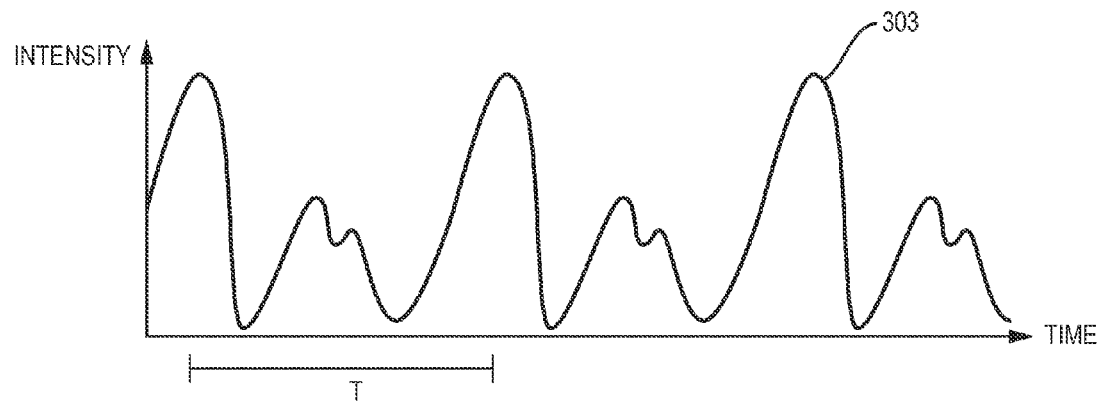

In FIG. 3A, the modulation of the radiant power of the light source comprises a sinusoidal waveform 301. FIG. 3B shows an example, in which the modulation comprises a non-sinusoidal, periodic waveform 302. FIG. 3C shows another example, in which the modulation comprises a non-sinusoidal, periodic waveform 303.

Figure 4:
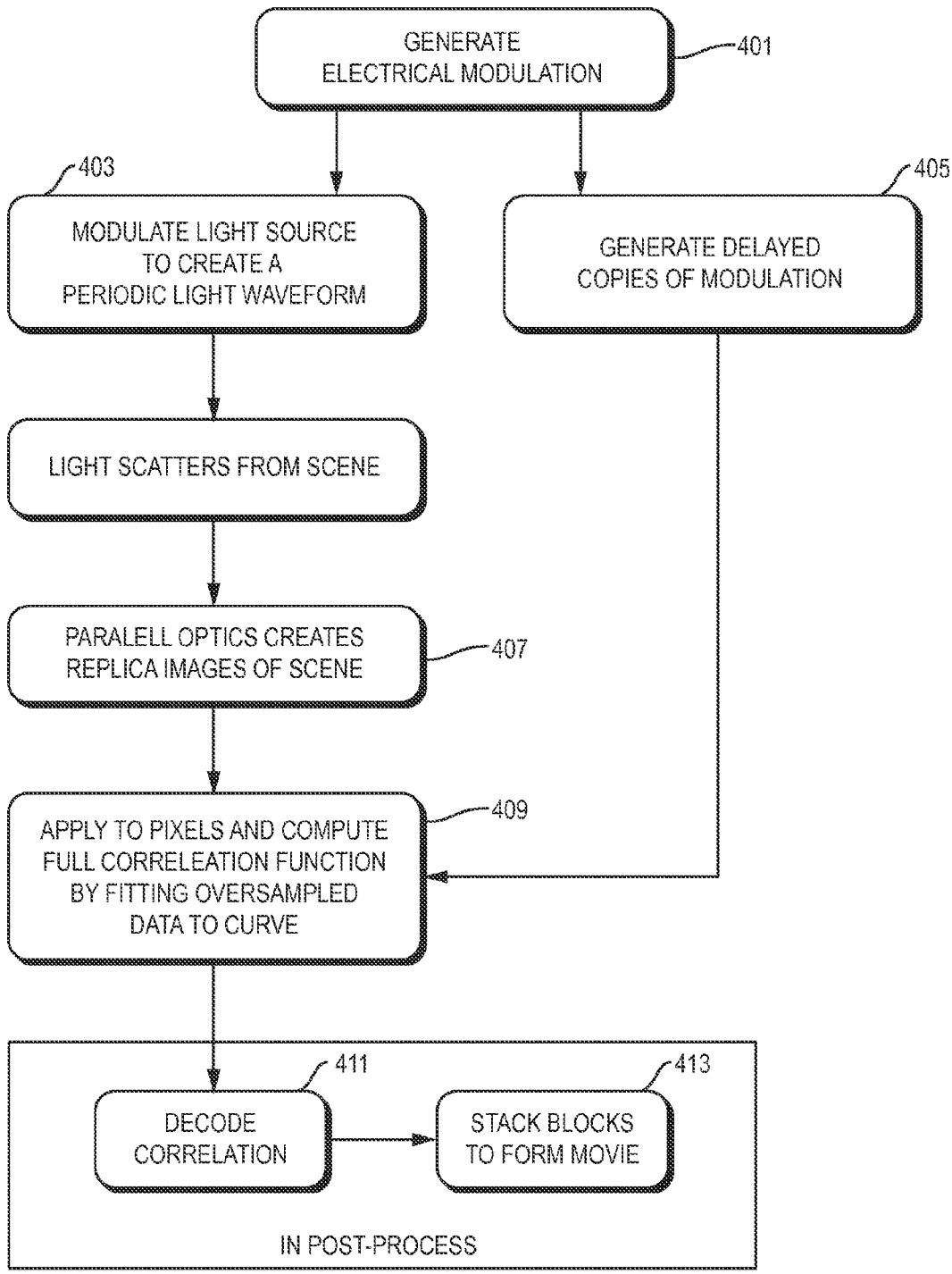
FIG. 4 show steps in an imaging method.

FIG. 4 show steps in an imaging method. In the example shown in FIG. 4, the steps include: Use a signal generator (e.g., an RF oscillator, FPGA or IC) to generate electrical modulation 401, such that the electrical modulation controls (i) modulation of radiant power of a light source and (ii) serves as a reference signal for a light sensor. Modulate the radiant power of a light source to create a periodic light waveform 403. The periodic waveform may have any arbitrary shape, including a non-sinusoidal shape. Also, generate delayed copies of the electrical modulation 405. After light scatters from a scene, parallel optics create replica images of the scene 407. Apply a delayed and phase-shifted copy of the electrical modulation to modulate the gain of subregions of respective pixels, while the received light is measured. Compute a full correlation function by fitting oversampled data to a curve 409. In post-processing, decode the correlation 411 and stack blocks to form a movie 413.

In the example shown in FIG. 1, there is a trade-off between spatial and temporal resolution: increasing the temporal resolution requires increasing the number of blocks in the light sensor, which decreases the number of pixels per block in an axis of deflection (and thus the spatial resolution in that axis of deflection).

However, the camera's resolution may be improved by causing the light source to emit multiple modulation frequencies to generate a code. For example, the scene may be assumed to be sparse in some basis (e.g., a "pixel" basis or a Fourier basis). A scene is sparse if it can be represented by a vector whose total number of nonzero elements is much smaller than the total number of elements in the vector. For example, for a 2D scene, if most of the pixels are black (0 intensity value) except for a small number of bright (nonzero) pixels, then the scene is sparse in the pixel basis. If the scene is represented by a vector X and the system is characterized by a linear matrix A, then the product Ax represents the measured data vector b, that is Ax=b. Ax is a vector equal to the sum of the columns of A, each weighted by an entry in x. For example: (i) if a scene consists of only a few stars against a large dark sky, most pixels are zero—the scene is sparse in the "pixel" basis; and (ii) if a scene contains only a few cosine patterns, it's sparse in the Fourier basis.

In exemplary implementations, the code is such that the mask is as "incoherent" as possible with the sparse basis, so that any frame contains some mixture all potential entries of x.

There are other potential priors that can be used. For example, the statistics of natural scenes (histograms of pixel values) usually obey certain properties that can be used to design some useful code.

For example, if the scene comprises an opaque sheet of paper at 2 meters and a semi-transparent sheet at 1 meter from the camera, then the light source could emit a 30 MHz modulation, record what comes back, and then do the same for 50 MHz and records what comes back (i.e., make sequential measurements). These are two different (independent) measurements, from which one or more processors can separate the light reflecting from each sheet.

To explain this example in more detail: In this example, there are two sheets so that the camera records light from both. First, a first signal is emitted. The first signal has a modulation frequency $f_1$ and can be described as $p(2\pi t f_1)$, where t is time and p is a measure of intensity. The contribution of the first reflection of the first signal (from the semi-transparent sheet at 1 meter), at a pixel of the light sensor, can be described as $p(2\pi t f_1 + \phi_1)$. The contribution of the second reflection of the first signal (from the opaque sheet at 2 meters), at that pixel, can be described as $p(2\pi t f_1 + \phi_2)$. The measured signal at that pixel is $p(2\pi t f_1 + \phi_1) + p(2\pi t f_1 + \phi_2)$. Then, a second signal is emitted. The second signal has a different modulation frequency $f_2$. As a result, the measured signal at that pixel changes to $p(2\pi t f_2 + \phi_1) + p(2\pi t f_2 + \phi_2)$. These two measurements are linearly independent and computer processors can solve for the two unknown phase shifts $\phi_1$ and $\phi_2$. These two phase shifts ($\phi_1$ and $\phi_2$) are related to the depth and the delay time to the respective sheets. The computer processors may use $\phi_1$ and $\phi_2$ to compute when light reflected from the two respective sheets and to reconstruct light scattering from them.

In this example, the processors may: (a) determine the phase shifts and therefore the propagation times between scattering events; and (b) compute a multiple-frame movie, by reconstructing the scattering events from the phase shifts. Thus, the processors may use the separate light reflecting from each respective sheet to compute a movie of light scattering through this scene. In this example, if data from a first M-block-sequence is captured while light is emitted at the first modulation frequency $f_1$ and data from a second M-block-sequence is captured while light is emitted at the second modulation frequency $f_2$, then processors may use this data to compute an M-frame movie.

In this example, the light source may be modulated sequentially, first by the first frequency and then by the second frequency. Or, the light source may be modulated with both frequencies simultaneously. In that case, because the light source is a linear system, the light signal that is emitted is a sum of a first signal at the first frequency and the second signal at the second frequency. More complex scenes will require more modulation frequencies. Preferably, the number of modulation frequencies employed is greater than the number of different depths to be measured in the scene. This provides robustness against noise.

Applications: The camera has multi-million frames per second. This allows for imaging events that last for hundreds of nanoseconds to microseconds, including ballistics, explosions, nanosecond-scale chemical reactions, and fusion reactions.

In some implementations, the imaging system may measure depth as follows: The cross-correlation measurement is used to reconstruct the relative phase shift between the emitted and reflected signals. This phase shift $\phi$ is used to calculate the depth d as follows: $d = \phi c / 4\pi f$, where C is the speed of light and f is the modulation frequency.

In exemplary implementations of this invention, one or more electronic processors are specially adapted: (1) to control the operation of, or interface with, hardware components of a camera, including any light source and any light sensor; (2) to perform calculations to compute phase shifts and propagation times between scattering events; (3) to perform calculations to compute a movie of light scattering from a scene; (4) to perform calculations to determine scene depth; (5) to receive signals indicative of human input, (6) to output signals for controlling transducers for outputting information in human perceivable format, and (7) to process data, to perform computations, to execute any algorithm or software, and to control the read or write of data to and from memory devices. The one or more processors may be located in any position or positions within or outside of the camera. For example: (a) at least some of the one or more processors may be embedded within or housed together with other components of the camera, such as the signal generator, light source, light sensor, or other electronic components of the camera; and (b) at least some of the one or more processors may be remote from other components of the camera. The one or more processors may be connected to each other or to other components in the camera either: (a) wirelessly, (b) by wired connection, or (c) by a combination of wired and wireless connections.

Alternative Implementations:

This invention is not limited to the implementations described above. Here are some non-limiting examples of other ways in which this invention may be implemented.

In some implementations, this invention is used to create a conventional 2D image: Each block records one time-frame. The time-frames of each block are different. A conventional 2D photo, which is basically a very long exposure/low framerate video, is computed by summing all the frames together.

In some implementations, this invention is used to capture a light field image: To do so, the time delays of each block are programmed to be the same (e.g., zero delay), so that each block views the scene at the same time. Because of the slight shift in perspective of each lenslet-block pair, a light field will be recorded.

In some implementations, this invention can be used to detect or analyze scenes that have time responses themselves instead of just reflections (e.g., from a wall). For example, if we want to look at the dynamics of a fluorescent material decaying in intensity at a given depth, the received signal S is different than it would be if the material were just reflecting.

In many implementations of this invention (including some described above), homodyne detection is used. Alternatively, heterodyne detection may be used. In the heterodyne case, radiant power of light emitted by a light source in the camera may be modulated at a first modulation frequency, while pixel gains in the light sensor are modulated with a different frequency. In the heterodyne case, the requisite correlation measurements are embedded in the frequency difference between the two signals.

DEFINITIONS

Here are a few definitions and clarifications.

The terms "a" and "an", when modifying a noun, do not imply that only one of the noun exists.

A "block" means (a) a subregion of a pixel array, which subregion contains less pixels than the total number of pixels in the pixel array; or (b) a component in an array of components, where each component in the array of components is itself a separate pixel array.

The term "camera" shall be construed broadly. Here are some non-limiting examples of a "camera": (a) an optical instrument that records images; (b) a digital camera; (c) a camera that uses photographic film or a photographic plate; (d) a light field camera; (e) a time-of-flight camera; (f) an imaging system, (g) a light sensor; (h) apparatus that includes a light sensor; or (i) apparatus for gathering data about light incident on the apparatus.

The term "comprise" (and grammatical variations thereof) shall be construed broadly, as if followed by "without limitation". If A comprises B, then A includes B and may include other things.

"Defined Term" means a term that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The term "for instance" means for example.

The term "frame" shall be construed broadly. For example, the term "frame" includes measured data about a scene that is captured by a camera during a single time period or single exposure, even if (i) the data is not humanly perceptible, (ii) the data has not been computationally processed, and (iii) there is not a one-to-one mapping between the data and the scene being imaged.

In the context of a camera (or components of a camera), "front" is optically closer to the scene being imaged, and "rear" is optically further from the scene, during normal operation of the camera.

"Herein" means in this document, including text, specification, claims, abstract, and drawings.

The terms "horizontal" and "vertical" shall be construed broadly. For example, "horizontal" and "vertical" may refer to two arbitrarily chosen coordinate axes in a Euclidian two dimensional space, regardless of whether the "vertical" axis is aligned with the orientation of the local gravitational field. For example, a "vertical" axis may oriented along a local surface normal of a physical object, regardless of the orientation of the local gravitational field.

The term "include" (and grammatical variations thereof) shall be construed broadly, as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure, or radiant energy density.

The term "light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

The term "magnitude" means absolute value.

The term "matrix" includes a matrix that has two or more rows, two or more columns, and at least one non-zero entry. The term "matrix" also includes a vector that has at least one non-zero entry and either (a) one row and two or more columns, or (b) one column and two or more rows. However, as used herein, (i) a scalar is not a "matrix", and (ii) a rectangular array of entries, all of which are zero (i.e., a so-called null matrix), is not a "matrix".

An "M-block-sequence" means a temporal sequence in which: (a) a first block, in a set of M blocks in a light sensor, captures a first image of a scene; (b) then a second block in the set captures a second image of the scene; (c) and so on, until the $M^{th}$ block in the set captures an $M^{th}$ image of the scene; such that each respective block, out of the M blocks in the light sensor, captures data regarding the scene during the temporal sequence. Thus, during an M-block-sequence, M blocks in a light sensor capture M frames.

"Modulation frequency" means the frequency of a periodic signal, which periodic signal is created by modulating the radiant power of a light source.

To "multiply" includes to multiply by an inverse. Thus, to "multiply" includes to divide.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

To compute a term that "satisfies" an equation: (a) does not require that calculations involve terms, variables or operations that are in the equation itself, as long as the term itself (subject to error, as described in part (b) of this sentence) is computed; and (b) includes computing a solution that differs from a correct solution by an error amount, which error amount arises from one or more of (i) rounding, (ii) other computational imprecision, including error due to modeling a continuous signal by a discrete signal or due to using an insufficiently small step size in calculations, and (iii) signal noise or other physical limitations of sensors or other physical equipment.

As used herein, the term "set" does not include a so-called empty set (i.e., a set with no elements). Mentioning a first set and a second set does not, in and of itself, create any implication regarding whether or not the first and second sets overlap (that is, intersect).

As used herein, a "subset" of a set consists of less than all of the elements of the set.

The term "such as" means for example.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

A matrix may be indicated by a bold capital letter (e.g., D). A vector may be indicated by a bold lower case letter (e.g., a). However, the absence of these indicators does not indicate that something is not a matrix or not a vector.

Except to the extent that the context clearly requires otherwise, if steps in a method are described herein, then: (1) steps in the method may occur in any order or sequence, even if the order or sequence is different than that described; (2) any step or steps in the method may occur more than once; (3) different steps, out of the steps in the method, may occur different number of times during the method, (4) any step or steps in the method may be done in parallel or serially; (5) any step or steps in the method may be performed iteratively; (5) a given step in the method may be applied to the same thing each time that the particular step occurs or may be applied to different things each time that the given step occurs; and (6) the steps described are not an exhaustive listing of all of the steps in the method, and the method may include other steps.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, grammatical variations include noun, verb, participle, adjective, or possessive forms, or different declensions, or different tenses. In each case described in this paragraph, Applicant is acting as Applicant's own lexicographer.

Variations:

This invention may be implemented in many different ways, in addition to those described above.

Here are some non-limiting examples of how this invention may be implemented:

This invention may be implemented as a method comprising: (a) during a time period, using a light source to illuminate a scene; (b) during the time period, using a light sensor to capture data about light that scatters from the scene; (c) during the time period, for each respective pixel in a set of pixels in the light sensor, applying a set of electrical reference signals to subregions of the respective pixel, such that (i) each respective reference signal in the set of electrical reference signals is applied to a respective subregion of the respective pixel to modify gain of the respective subregion, and (ii) the respective reference signals in the set of electrical reference signals differ from each other in phase; and (d) using one or more processors to calculate a full cross-correlation function for each respective pixel out of the set of pixels, by fitting light intensity measurements to a curve, the light intensity measurements being taken, respectively, by respective subregions of the respective pixel; in which method (i) the light source emits a superposition of multiple modulation frequencies during at least a portion of the time period, or (ii) the light source emits (A) a first modulation frequency, but not a second modulation frequency, during a first portion of the time period, and (B) the second modulation frequency, but not the first modulation frequency, during a second portion of the time period. Furthermore: (1) The light sensor may comprise M blocks; and during the time period, the light sensor may capture data in one or more M-block-sequences. (2) The number of reference signals in the set of electrical reference signals may be greater than four. (3) Light emitted by the light source may comprise a periodic signal, which periodic signal is not sinusoidal. (4) The one or more processors may compute a movie of light scattering from the scene. (5) A lenslet array may be positioned in front of the light sensor, such that each respective lenslet in the lenslet array is in front of a respective block in the light sensor. (6) The one or more processors may calculate a number of computed depths in the scene; and the number of computed depths in the scene may be less than the number of modulation frequencies emitted by the light source during the time period, either in temporal sequence or by superposition. (7) The light source may emit modulation frequencies in a pattern, which pattern is optimized to be incoherent with respect to the scene.

This invention may be implemented as a method comprising: (a) using a light sensor to capture, during one or more M-block-sequences, data regarding light that scatters from a scene; (b) during the one or more M-block-sequences; for each respective pixel in a set of pixels in the light sensor, applying a set of electrical reference signals to subregions of the respective pixel, such that (i) each respective reference signal in the set of electrical reference signals is applied to a respective subregion of the respective pixel to modify gain of the respective subregion, (ii) the respective reference signals in the set of electrical reference signals differ from each other in phase, and (iii) the number of reference signals in the set of electrical reference signals is greater than four; and (c) using one or more processors to calculate a full cross-correlation function for each respective pixel out of the set of pixels, by fitting light intensity measurements to a curve, the light intensity measurements being taken, respectively, by respective subregions of the respective pixel; in which method (i) a light source emits a superposition of multiple modulation frequencies during at least a portion of the one or more M-block-sequences, or (ii) the light source emits (A) a first modulation frequency, but not a second modulation frequency, during a first portion of the one or more M-block-sequences, and (B) the second modulation frequency, but not the first modulation frequency, during a second portion of the one or more M-block-sequences. Furthermore: (1) Light emitted by the light source may comprise a periodic signal, which periodic signal is not sinusoidal. (2) The one or more processors may compute a movie of light scattering from the scene. (3) The one or more processors may calculate a number of computed depths in the scene; and the number of computed depths in the scene may be less than the number of modulation frequencies emitted by the light source during the one or more M-block-sequences, either in temporal sequence or by superposition.

This invention may be implemented as a system comprising: (a) a light source for emitting light, such that (i) the light source emits a superposition of multiple modulation frequencies during at least a portion of a time period, or (ii) the light source emits (A) a first modulation frequency, but not a second modulation frequency, during a first portion of the time period, and (B) the second modulation frequency, but not the first modulation frequency, during a second portion of the time period; (b) a light sensor for capturing data about light that scatters from a scene, such that during the time period, for each respective pixel in a set of pixels in the light sensor, a set of electrical reference signals is applied to subregions of the respective pixel, such that (i) each respective reference signal in the set of electrical reference signals is applied to a respective subregion of the respective pixel to modify gain of the respective subregion, and (ii) the respective reference signals in the set of electrical reference signals differ from each other in phase; and (c) one or more processors, which processor are programmed to calculate a full cross-correlation function for each respective pixel out of the set of pixels, by fitting light intensity measurements to a curve, the light intensity measurements being taken, respectively, by respective subregions of the respective pixel. Furthermore: (1) The light sensor may comprise M blocks; and during the time period, the light sensor may capture data in one or more M-block-sequences. (2) The number of reference signals in the set of electrical reference signals may be greater than four. (3) Light emitted by the light source may comprise a periodic signal, which periodic signal is not sinusoidal. (4) The system may include a field-programmable-gate-array for generating an electrical control signal for controlling modulation of radiant power of the light source. (5) The electrical control signal may be such that the light source emits modulation frequencies in a pattern, which pattern is optimized to be incoherent with respect to the scene. (6) A lenslet array may be positioned in front of the light source, such that each respective lenslet in the lenslet array is in front of a respective block in the light sensor. (7) The one or more processors may be programmed to calculate a number of computed scene depths, which number of computed scene depths is less than the total number of modulation frequencies emitted by the light source during the time period in temporal sequence or by superposition.

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also within the scope of the present invention. Numerous modifications may be made by one of ordinary skill in the art without departing from the scope of the invention.

What is claimed is:

1. A method comprising:
   (a) during a time period, using a light source to illuminate a scene;
   (b) during the time period, using a light sensor to capture data about light that scatters from the scene;
   (c) during the time period, for each respective pixel in a set of pixels in the light sensor, applying a set of electrical reference signals to subregions of the respective pixel, such that (i) each respective reference signal in the set of electrical reference signals is applied to a respective subregion of the respective pixel to modify gain of the respective subregion, and (ii) the respective reference signals in the set of reference of electrical reference signals differ from each other in phase; and
   (d) using one or more processors to calculate a full cross-correlation function for each respective pixel out of the set of pixels, by fitting light intensity measurements to a curve, the light intensity measurements being taken, respectively, by respective subregions of the respective pixel;
   in which method
   (i) the light source emits a superposition of multiple modulation frequencies during at least a portion of the time period, or
   (ii) the light source emits
      (A) a first modulation frequency, but not a second modulation frequency, during a first portion of the time period, and
      (B) the second modulation frequency, but not the first modulation frequency, during a second portion of the time period.

2. The method of claim 1, wherein:
   (a) the light sensor comprises M blocks; and
   (b) during the time period, the light sensor captures data in one or more M-block-sequences.

3. The method of claim 2, wherein a lenslet array is positioned in front of the light sensor, such that each respective lenslet in the lenslet array is in front of a respective block in the light sensor.

4. The method of claim 1, wherein the number of reference signals in the set of electrical reference signals is greater than four.

5. The method of claim 1, wherein light emitted by the light source comprises a periodic signal, which periodic signal is not sinusoidal.

6. The method of claim 1, wherein the method further comprises using the one or more processors to compute a movie of light scattering from the scene.

7. The method of claim 1, wherein:
(a) the one or more processors calculate a number of computed depths in the scene; and
(b) the number of computed depths in the scene is less than the number of modulation frequencies emitted by the light source during the time period, either in temporal sequence or by superposition.

8. The method of claim 1, wherein the light source emits modulation frequencies in a pattern, which pattern is optimized to be incoherent with respect to the scene.

9. A method comprising:
(a) using a light sensor to capture, during one or more M-block-sequences, data regarding light that scatters from a scene;
(b) during the one or more M-block-sequences; for each respective pixel in a set of pixels in the light sensor, applying a set of electrical reference signals to subregions of the respective pixel, such that (i) each respective reference signal in the set of electrical reference signals is applied to a respective subregion of the respective pixel to modify gain of the respective subregion, (ii) the respective reference signals in the set of electrical reference signals differ from each other in phase, and (iii) the number of reference signals in the set of electrical reference signals is greater than four; and
(c) using one or more processors to calculate a full cross-correlation function for each respective pixel out of the set of pixels, by fitting light intensity measurements to a curve, the light intensity measurements being taken, respectively, by respective subregions of the respective pixel;
in which method
(i) a light source emits a superposition of multiple modulation frequencies during at least a portion of the one or more M-block-sequences, or
(ii) the light source emits
(A) a first modulation frequency, but not a second modulation frequency, during a first portion of the one or more M-block-sequences, and
(B) the second modulation frequency, but not the first modulation frequency, during a second portion of the one or more M-block-sequences.

10. The method of claim 9, wherein light emitted by the light source comprises a periodic signal, which periodic signal is not sinusoidal.

11. The method of claim 9, wherein the method further comprises using the one or more processors to compute a movie of light scattering from the scene.

12. The method of claim 9, wherein:
(a) the one or more processors calculate a number of computed depths in the scene; and
(b) the number of computed depths in the scene is less than the number of modulation frequencies emitted by the light source during the one or more M-block-sequences, either in temporal sequence or by superposition.

13. A system comprising:
(a) a light source for emitting light, such that (i) the light source emits a superposition of multiple modulation frequencies during at least a portion of a time period, or (ii) the light source emits (A) a first modulation frequency, but not a second modulation frequency, during a first portion of the time period, and (B) the second modulation frequency, but not the first modulation frequency, during a second portion of the time period;
(b) a light sensor for capturing data about light that scatters from a scene, such that during the time period, for each respective pixel in a set of pixels in the light sensor, a set of electrical reference signals is applied to subregions of the respective pixel, such that (i) each respective reference signal in the set of electrical reference signals is applied to a respective subregion of the respective pixel to modify gain of the respective subregion, and (ii) the respective reference signals in the set of electrical reference signals differ from each other in phase; and
(c) one or more processors, which processor are programmed to calculate a full cross-correlation function for each respective pixel out of the set of pixels, by fitting light intensity measurements to a curve, the light intensity measurements being taken, respectively, by respective subregions of the respective pixel.

14. The system of claim 13, wherein:
(a) the light sensor comprises M blocks; and
(b) during the time period, the light sensor captures data in one or more M-block-sequences.

15. The system of claim 14, wherein a lenslet array is positioned in front of the light sensor, such that each respective lenslet in the lenslet array is in front of a respective block in the light sensor.

16. The system of claim 13, wherein the number of reference signals in the set of electrical reference signals is greater than four.

17. The system of claim 13, wherein light emitted by the light source comprises a periodic signal, which periodic signal is not sinusoidal.

18. The system of claim 17, wherein the system includes a field-programmable-gate-array for generating an electrical control signal for controlling modulation of radiant power of the light source.

19. The system of claim 18, wherein the electrical control signal is such that the light source emits modulation frequencies in a pattern, which pattern is optimized to be incoherent with respect to the scene.

20. The system of claim 13, wherein the one or more processors are programmed to calculate a number of computed scene depths, which number of computed scene depths is less than the total number of modulation frequencies emitted by the light source during the time period in temporal sequence or by superposition.

* * * * *